T. L. CARBONE.
ECONOMIZER FOR INCLOSED ARC LAMPS.
APPLICATION FILED MAR. 10, 1916.
1,404,341. Patented Jan. 24, 1922.
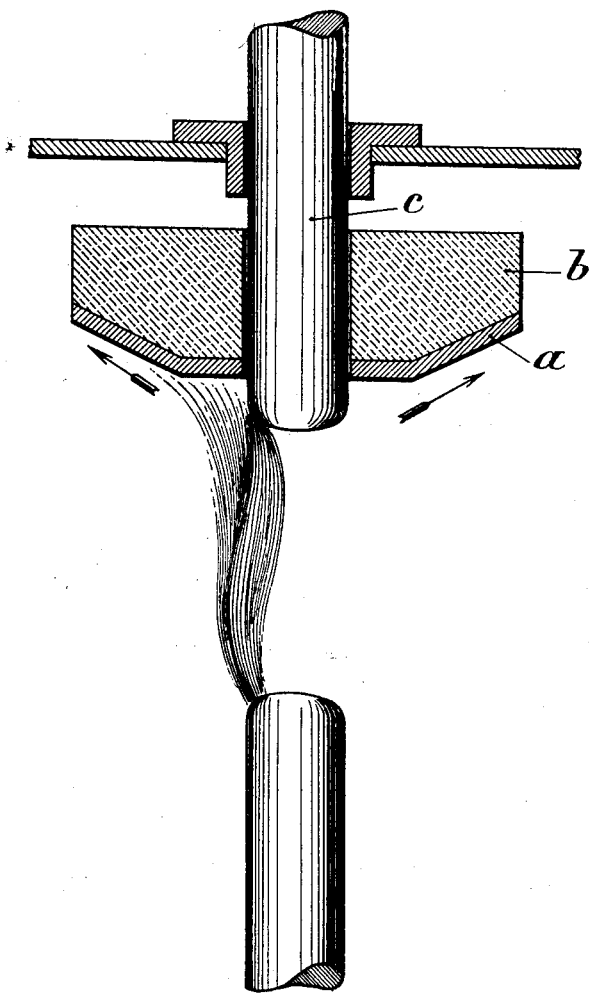
INVENTOR
Tito Livio Carbone
by John Lotka
ATTORNEY

UNITED STATES PATENT OFFICE.

TITO LIVIO CARBONE, OF CHARLOTTENBURG, NEAR BERLIN, GERMANY.

ECONOMIZER FOR INCLOSED-ARC LAMPS.

1,404,341. Specification of Letters Patent. Patented Jan. 24, 1922.

Application filed March 10, 1916. Serial No. 83,289.

(GRANTED UNDER THE PROVISIONS OF THE ACT OF MARCH 3, 1921, 41 STAT. L., 1313.)

*To all whom it may concern:*

Be it known that I, TITO LIVIO CARBONE, a civil engineer, a citizen of the Swiss Republic, and a resident of 111 Bismarckstrasse, in the city of Charlottenburg, near Berlin, Germany, have invented new and useful Improvements in Economizers for Inclosed-Arc Lamps; and I do hereby declare the following to be a full, clear, and exact description of the invention, such as will enable others skilled in the art to which it appertains to make and use the same.

This invention has reference to inclosed arc lamps of long duration and particularly to lamps of this kind in which salted or flame arc carbons are employed and the invention has for its object to keep the upper carbon as cool as possible at its burning end in order to avoid the premature destruction of the light emitting qualities of the salts therein contained.

In burning lamps of this kind with tensions up to 45 volts the means heretofore employed are sufficient for avoiding the wearing off of the upper carbon. By increasing the tension in these lamps however, beyond 45 volts that is to say, using voltages of 50, 60, 70 or more volts the upper carbon is heated very highly and after burning a very short time a decrease of the illuminating power and a changing of the color of the light take place in view of the fact that the descending part of the carbon has already undergone a premature reduction of its light emitting properties.

In order to be able to overcome this difficulty in such lamps of high voltages and generally speaking when making use of carbons which can easily be made incandescent the so-called economizer in accordance with my invention instead of being provided with a conical inward portion as heretofore employed, is shaped conically outwards so that the deepest point of the economizer is at the burning end of this carbon, the heat escaping from this point upwards along the conical walls. As a result of this arrangement the carbon is not excessively heated above the burning end and the premature wasting away of the salts of the carbon cannot take place so that they retain their light emitting qualities and an always uniform amount of light is obtained.

The invention is illustrated diagrammatically on the accompanying drawing showing an embodiment of the invention by way of example. The metal plate $a$ has an outwardly ascending conical shape and is surmounted or covered by a piece of chamotte or magnesia $b$. The upper carbon $c$ projects only with the extremity of its burning end from the economizer, so that the heating extends only to the burning end that happens to be operating while the heating of the upper part of the carbon is avoided by the fact that the heat escapes upwards along the conical walls of the economizer so as to be deflected away from the carbon. The metal plate $a$ causes the vapors to be caught and also protects the refractory upper body $b$ from direct contact with the flame of the arc. Another important effect of the metal plate $a$ consists in distributing the heat of the arc quickly over the entire surface of said plate and from the latter, to the refractory upper body $b$ which is in contact therewith and which, being a poor conductor of heat, acts as a heat reservoir or economizer and maintains a practically constant temperature of the metal plate. The ends of the electrodes will thus be in a zone of practically constant temperature, and the amount of electrode salts melted and vaporized will be no more than the arc can consume. By this arrangement I secure a maximum light-emission and a uniform burning off of the electrode ends.

The economizer may of course vary in shape; that is to say, the conical shape may be more or less marked.

The same arrangement of economizer may also be employed for lamps with lower voltages provided carbons are used in such lamps which become incandescent very readily.

Having now particularly described and ascertained the nature of my said invention and in what manner the same is to be performed, I declare that what I claim is:—

1. In connection with the upper carbon of an arc lamp, an upwardly-flaring economizer comprising a perforated plate of material which is a good conductor of heat and a perforated body of refractory material which is a poor conductor of heat in contact with said plate and above the same, the carbon extending through the perforations of said plate and body.

2. In connection with an arc lamp electrode, an economizer through which said electrode extends, said economizer comprising a metal plate and a body of refractory material which is a poor conductor of heat in contact with that face of said plate which is farthest away from the flame end of the electrode.

In testimony whereof I affix my signature, in presence of two witnesses.

TITO LIVIO CARBONE.

Witnesses:
CARL GUBBER,
BERTHA C. GRUB.